United States Patent

Gallas et al.

[11] Patent Number: 5,222,413
[45] Date of Patent: Jun. 29, 1993

[54] CABLE ASSEMBLY HAVING SPRING BIASING ADJUSTMENT

[75] Inventors: James A. Gallas, Livonia; Frederick P. Samson, Southfield, both of Mich.

[73] Assignee: Ford Motor Company, Dearborn, Mich.

[21] Appl. No.: 878,354

[22] Filed: May 4, 1992

[51] Int. Cl.⁵ .................. F16C 1/10; F16C 1/28
[52] U.S. Cl. .................. 74/502.4; 74/501.5 R; 74/502; 74/502.3; 74/502.6
[58] Field of Search ......... 74/502.4, 501.5 R, 502, 74/502.3, 502.5, 502.6

[56] References Cited

U.S. PATENT DOCUMENTS

| | | | |
|---|---|---|---|
| 3,439,555 | 4/1969 | Rech | 74/502.4 |
| 4,366,725 | 1/1983 | Kondo | 74/502.4 |
| 4,658,668 | 4/1987 | Stocker | 74/501.5 R |
| 4,669,330 | 6/1987 | Stocker | 74/501.5 R |
| 4,694,706 | 9/1987 | Lichtenberg et al. | 74/502 X |
| 4,790,206 | 12/1988 | Thomas | 74/502.4 |
| 4,798,098 | 1/1989 | Keller et al. | 74/502.6 X |
| 4,799,400 | 1/1989 | Pickell | 74/502.6 |
| 4,841,805 | 6/1989 | Italiano | 74/502 X |
| 4,854,185 | 8/1989 | Lichtenberg et al. | 74/501.5 R |
| 4,854,426 | 8/1989 | Solano et al. | 74/501.5 R X |
| 4,869,123 | 9/1989 | Stocker | 74/501.5 R |
| 5,086,662 | 2/1992 | Tayon et al. | 74/502.4 X |
| 5,138,897 | 8/1992 | Beard et al. | 74/501.5 R |

Primary Examiner—Leslie A. Braun
Assistant Examiner—Andrea Pitts
Attorney, Agent, or Firm—Frank G. McKenzie; Roger L. May

[57] ABSTRACT

A cable length adjusting device includes a cable located within a conduit, which is fixed against displacement at longitudinally spaced positions. A first end of the cable includes a fitting fixed to a ball stud extending from a lever whose position is a reference position. At the opposite end of the cable a fitting engages a ball stud extending from another lever. A spring clip in a form of a compression spring forces a rod end, fixed to one end of the cable, away from the location of the second ball stud and toward the reference position. A cable adjusting screw fixes the rod and spring clip in position on the second fitting.

10 Claims, 2 Drawing Sheets

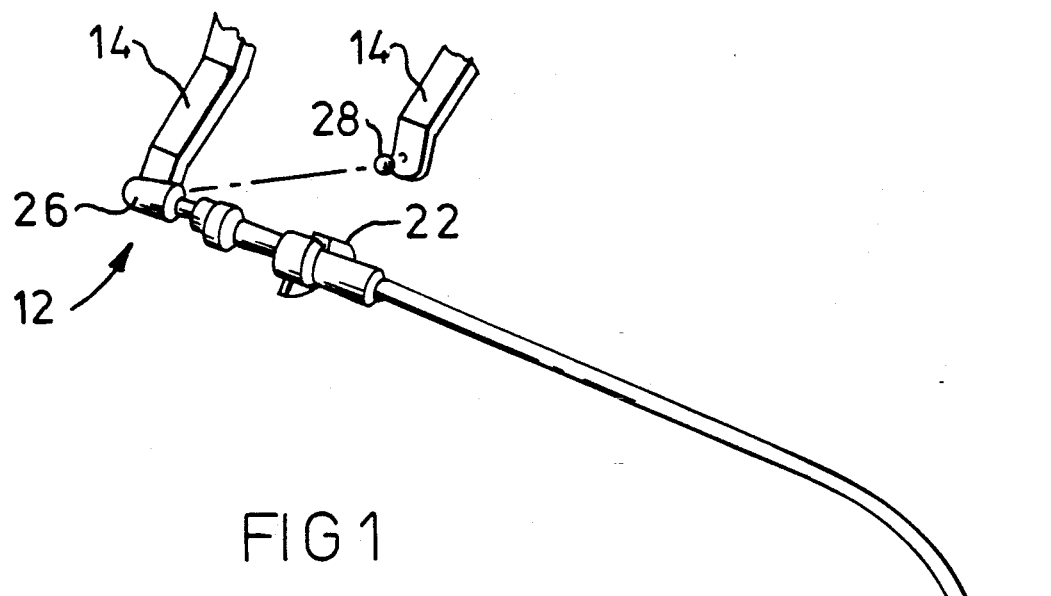
FIG 1
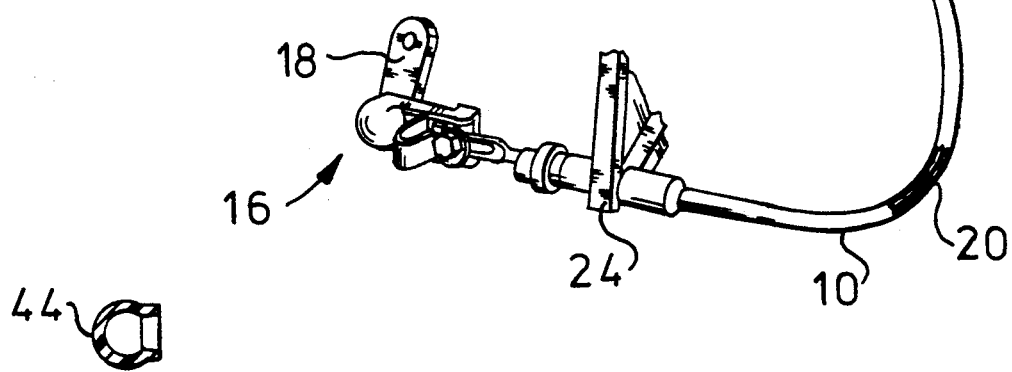
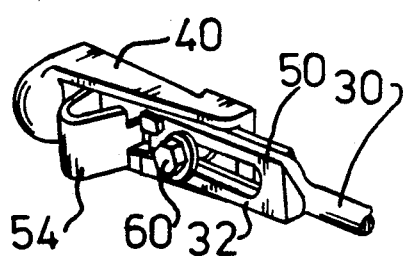
FIG 7
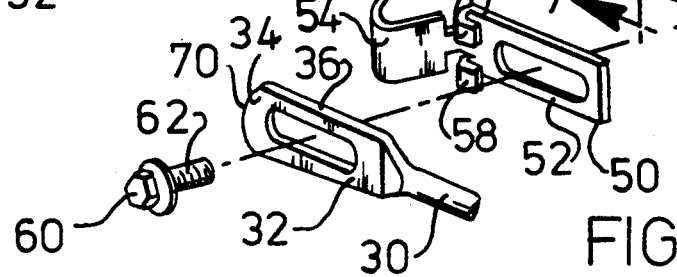
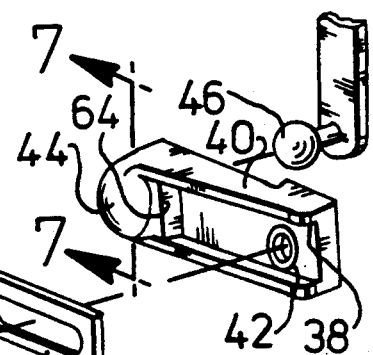

CABLE ASSEMBLY HAVING SPRING BIASING ADJUSTMENT

BACKGROUND OF THE INVENTION

1. Field of the Invention

This invention relates to a device for transmitting motion by a cable located within a flexible conduit and extending along a curved path. More particularly, this invention pertains to a device for automatically adjusting the position of one end of a cable with respect to a reference position at the opposite end of the cable.

2. Description of the Prior Art

Cable assemblies that transmit motion from one moveable component to another generally include a device located at each end of a conduit for attaching a conduit to a supporting structure. A cable, located within the conduit, extends from each end of the conduit. The purpose of the cable is to transmit motion of a device, to which one end of the cable is attached, to another device at the opposite end of the cable. Generally the cable assembly including the conduit is in the form of a loop that extends between the two attachments at the ends of the cable. The diameter of the conduit is substantially larger than the diameter of the cable; therefore, the cable can move laterally within the conduit until it contacts the restraining inner surface of the conduit. This produces a condition called backlash or lost motion, i.e., a difference between the displacement of the reference end of the cable and the displacement produced at the opposite end of the cable.

Usually the cable transmits motion both in tension and compression between the reference position and the opposite end of the cable. Frequently in assemblies of this type, displacement of the reference position must be closely related to the corresponding displacement at the opposite end of the cable so that the reference motion produces a corresponding movement, within an acceptable tolerance, at the opposite end of the cable. When the critical condition for producing this corresponding displacement causes compression in the cable located within the conduit, some means external to the cable itself must be applied to bias backlash and to produce a resulting displacement that is within a consistently close tolerance of the displacement of the reference end of the cable.

U.S. Pat. No. 4,669,330 describes a cable length adjuster that includes a compression spring located along the cable length between a housing and a device that locks the cable with respect to the housing. A pivoting latch aligns the locking device with teeth formed on a surface of the housing, thereby forcing the teeth into engaging contact with teeth formed on the housing. The pivoting member holds the cable in this locked position but the compression spring is ineffective toward locating an attachment at one end of the cable with respect to a desired position for that attachment.

SUMMARY OF THE INVENTION

The cable length adjusting device according to the present invention includes supporting brackets spaced longitudinally along the length of a conduit that contains a cable. The support brackets fix the position of the conduit against displacement and generally support the cable assembly. One end of the cable is fixed to a first moveable member by snapping a molded fitting containing a receptacle over a ball stud extending outwardly from the moveable member. The second end of the cable assembly carries a rod end having a longitudinally directed slotted hole and an end surface. A spring clip having a longitudinally directed slotted hole, aligned with the hole of the rod end, includes an arcuate flange having a surface that bears against a blocking surface on a molded fitting, which receives the rod end and the spring clip within a reset. The fitting contains a molded threaded nut adapted to be engaged by the threads of a mounting screw that extends through the slotted holes of the rod end and spring clip. The spring clip also include tabs, which hold the rod end in position, and webs, against which the end of the rod end is forced into contact by the effect of the compression spring bearing against the stop surface on the fitting.

BRIEF DESCRIPTION OF THE DRAWINGS

FIG. 1 shows schematically a cable assembly connecting pivoting levers.

FIG. 2 shows the components of the cable attachment according to this invention in their assembled positions.

FIG. 3 is an isometric diagram of one end of a cable assembly according to this invention showing the components that complete the attachment of one end of the cable assembly to a fitting.

FIG. 7 is a cross section taken at plane 7—7 of FIG. 3.

DESCRIPTION OF THE PREFERRED EMBODIMENT

Figure 4:
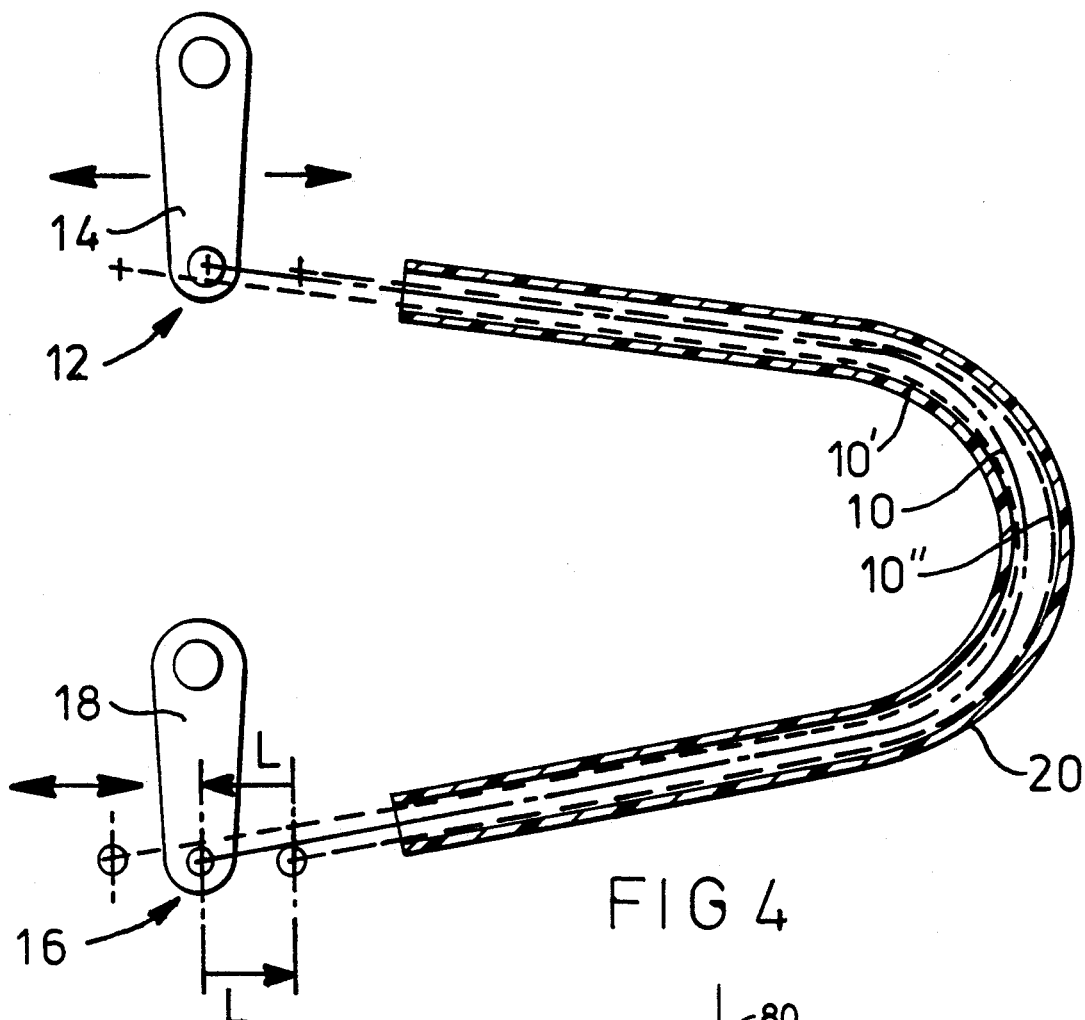
FIG. 4 is a cross section through a cable conduit showing the range of lateral movement of a cable within the conduit.

Referring first to FIG. 1, a cable assembly 10 for use in an automotive vehicle conventionally transmits motion from a first attachment 12 at a pivotably mounted lever 14, to a second attachment 16, attached to a second pivotably mounted lever 18. Typically, one end of the cable is joined by crimping to a fitting 26 having a receptacle that receives by interference fit a ball stud 28 extending outward laterally from the surface of lever 14 so that the ball stud snaps into and is held within the receptacle. The interference fit assures that any movement of lever 14 about its pivot produces corresponding longitudinal displacement of fitting 26 at the end of the cable.

Near the second end of the cable assembly, the cable is connected to a rod end 30 having a elongated, longitudinally directed hole 32, a planar surface 34 and lateral surface 36. The rod end is located within a longitudinally directed slot 38, formed within a fitting 40 having a threaded nut 42 aligned with the slotted hole 32. Fitting 40 defines a ball stud receptacle 44 adapted to receive and retain therein a ball stud 46 extending outwardly from the end of lever 18.

A cable spring 48, formed of spring steel, includes a leg 50 having a longitudinally directed slotted hole 52, an arcuate flange 54 extending laterally from leg 50, and two tabs 56, 58 defining a recess between their inner surfaces and the facing surface of leg 50. The spacing between the tabs and the surface of leg 50 is sized to receive the rod end therein and the slotted holes 32 and 52 of the rod end and cable spring are substantially aligned. A cable adjusting screw 60 having a screw thread 62, adapted to engage threads in the molded nut 42, extends through slotted holes 32, 52 to engage the nut 42.

Fitting 40 includes a stop surface 64, against which the edge 66 of the arcuate flange 54 of the cable spring 48 is continually held in contact. The tabs 56, 58 that extend laterally from the surface 52 include webs 68 adapted to contact the end surface 70 of rod end 30.

Installation of a cable assembly and the adjusting device is described next. First, the angular position of lever 14 is fixed and the length of the cable assembly that extends between the ball stud receptacles at each end of the cable assembly is established. Then conduit 20 is attached near each end of the cable assembly to brackets 22 and 24, respectively. The ball stud receptacle at the adjacent end of the cable assembly is snapped over ball stud 28 that extends from lever 14. The cable spring is located within the slot 38 formed in fitting 40 so that surface 66 of the spring is brought into contact with the stop surface 64. Rod end 30, located at the adjacent end of the cable, is fitted within slot 38 and drawn into contact with web 68 at the end of the cable spring leg below tabs 56 and 58. The cable adjusting screw 60 is fitted through holes 32 and 52 in the rod end and cable spring and is threaded into nut 42 loosely enough to allow relative motion between rod end 30 and fitting 40.

The ball stud receptacle 44 on fitting 40 then is snapped over ball stud 46. Lever 18 is located in a position corresponding to the position of lever 14. The cable spring then forces rod end 30 away from the axis of the ball stud 46 due to contact between the end 70 of the rod end and the webs 68 of cable spring tabs. Finally, adjusting screw 60 is drawn up into firm engagement with the threads of nut 42, thereby fixing the position of the rod end 30.

FIG. 4 shows conduit 20 fixed at each end by attachment to brackets 22,24, cable 10 located within the conduit, and pivotably mounted levers 14,18 to which the cable is attached. When lever 14 is near the midpoint of its range of movement, cable 10 is located at the position represented by the solid line in the conduit 20. When lever 14 pivots clockwise so that attachment 12 moves leftward, the cable pulls the second attachment 16 rightward, placing the cable in tension. The cable 10' moves to the radially inner surface of the conduit.

However, when attachment 12 moves rightward, the cable 10" is forced into compression, moves laterally outward within the conduit into contact with the inner surface of the conduit interior. Thereafter, only that portion of the movement of attachment 12 operates to move attachment 16 at the opposite end of the cable.

The adjusting screw can be set to bias backlash or lost motion, but this presumes careful attention by the operator who installs the cable and a consistent setting of the cable length.

Figure 5:
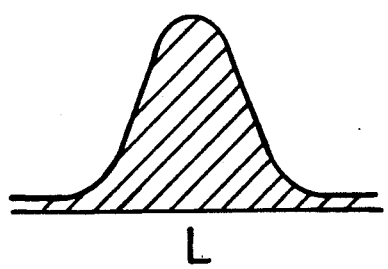
FIG. 5 shows the expected variation in output travel for manually adjusted backlash.

FIG. 5 represents the statistical scatter associated with producing displacement L at attachment 16 using operator settings of the cable length without benefit of this invention.

Figure 6:
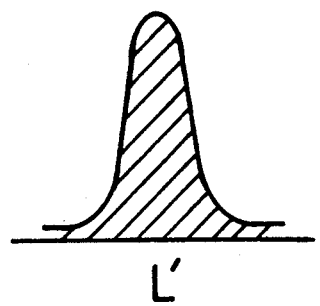
FIG. 6 represents the improved variation in output travel for the range of adjustment of spring-adjusted backlash resulting from use of the present invention.

The cable spring of this invention bias the cable toward position 10" of FIG. 4, thereby minimizing substantially the magnitude of lost motion at attachment 16 resulting from transmitting movement initiated at attachment 12. FIG. 6 represents the improved effect of this invention on producing more consistent and reliable transmittal of displacement L to attachment 16 from attachment 12.

Figure 8:
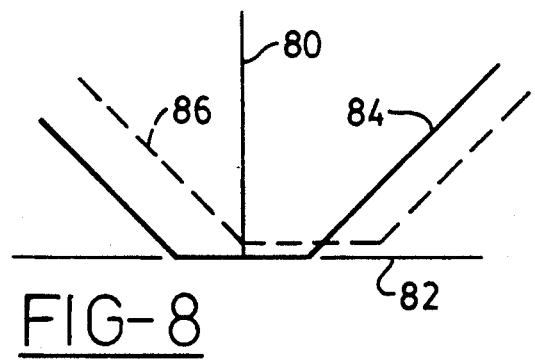
FIG. 8 is a diagram representing the relation between input travel and output travel for a manually adjusted cable assembly and an assembly according to this invention.

In FIG. 8 the vertical axis 80 represents movement or travel of the output end 16 of the cable assembly and the horizontal axis 82 represents movement of the input end 12. Curve 84 shows, for a cable assembly without the effect of this invention, i.e., where the backlash is adjusted manually at a nominal position, that there is a range, both to the left of the center or start position (where the cable assembly is in compression or pushing toward the output end) and to the right of the center position (where the assembly is in tension or pulling the output end), in which the output does not move in response to movement of the input. Beyond this range, the output moves in response to input movement.

Curve 86, is raised slightly above the horizontal axis to distinguish it from curve 84, but curve 86 is correctly located partially on the horizontal axis. Curve 86 represents movement of the input end and output end of a cable assembly according to this invention. The spring-adjusted backlash device of this invention effectively shifts or biases the curve rightward such that the output end moves immediately without any lost motion in response to movement of the input end, provided the cable is in compression when transmitting movement from the input end to the output end. The range of lost motion is located to the right hand side of the center position where the cable is in tension. After the input end moves beyond the range of lost motion the output end moves in response to movement of the input end.

After screw 60 is secured to nut 42, the spring does not affect the magnitude of loads in the cable assembly.

We claim:

1. A cable length adjusting device comprising:
   a flexible cable having first and second ends;
   a conduit surrounding the cable, extending along a portion of the cable length, mutually spaced locations on the conduit fixed against displacement;
   first attachment means for connecting the first end of the cable to a first moveable member;
   spring means for applying a compression force to the cable biasing the second end of the cable away from a second moveable member and toward the first moveable member;
   means for adjustably mutually connecting the second end of the cable, spring means and second moveable member against relative displacement; and
   second attachment means for connecting said connecting means to the second moveable member.

2. The device of claim 1 wherein the connecting means includes:
   a blocking surface;
   a rod end connected to the second end of the cable;
   a first fitting having a slot directed along the cable length, the rod end being located in said first fitting slot; and
   means for connecting the rod end and the first fitting.

3. The device of claim 2 wherein the spring means includes a spring having a leg extendings along the slot, a first member contacting the blocking surface and changing in length resiliently along the slot between the blocking surface and the leg, tabs extending from the leg and contacting the rod end at the second end of the cable, and means for connecting the spring to the first fitting and rod end.

4. The device of claim 3 wherein the connecting means includes a threaded nut, the spring leg includes an elongated hole extending along the slot, the rod end includes an elongated hole extending along the slot and aligned with the hole of the spring leg, and a screw located in the holes of the spring leg and rod end engaging threads of the nut.

5. The device of claim 1 wherein the second attachment means for connecting said position fixing means to the second moveable member includes:
- a first fitting connected to the second end of the cable, the first fitting including a receptacle;
- a stud extending outward from the first moveable member, the stud fitting within the receptacle of the second fitting, thereby connecting the first fitting and the second end of the cable.

6. The device of claim 1 wherein the first attachment means for connecting a first end of the cable to a first moveable member includes:
- a second fitting connected to the first end of the cable, the second fitting including a receptacle;
- a stud extending outward from the first moveable member, fitting within the receptacle of the second fitting, thereby connecting the second fitting and the first end of the cable.

7. A cable assembly connecting first and second moveable members, comprising:
- a flexible cable having a first end and a second end
- a rod end connected to the second end of the cable;
- a conduit surrounding the cable, extending along a portion of the cable length, mutually spaced locations on the conduit being fixed against displacement;
- first attachment means for connecting the first end of the cable to the first moveable member;
- a first fitting having a slot directed along the cable length, the rod end located in said slot, having a blocking surface;
- a spring having a leg extending along the slot, a first member contacting the blocking surface and adapted to change in length resiliently along the slot between the blocking surface and the leg, a surface contacting the rod end,
- means for mutually connecting the spring, first fitting and rod end; and
- second attachment means for connecting said first fitting means to the second moveable member.

8. The device of claim 7 wherein the connecting means includes a threaded nut, the spring leg includes an elongated hole extending along the slot, the rod end includes an elongated hole extending along the slot and aligned with the hole of the spring leg, and a screw located in the holes of the spring leg and rod end engaging threads of the nut.

9. The device of claim 7 wherein the second attachment means for connecting said first fitting means to the second moveable member includes:
- a receptacle;
- a stud extending outward from the second moveable member, the stud fitting within the receptacle, thereby connecting the first fitting and the second end of the cable.

10. The device of claim 7 wherein the first attachment means for connecting a first end of the cable to a first moveable member includes:
- a second fitting connected to the first end of the cable, the second fitting including a receptacle;
- a stud extending outward from the first moveable member, fitting within the receptable of the second fitting, thereby connecting the second fitting and the first end of the cable.

* * * * *